United States Patent
Cappello et al.

(10) Patent No.: US 11,528,577 B2
(45) Date of Patent: Dec. 13, 2022

(54) METHOD AND SYSTEM FOR GENERATING AN HRTF FOR A USER

(71) Applicant: Sony Interactive Entertainment Inc., Tokyo (JP)

(72) Inventors: Fabio Cappello, London (GB); Marina Villanueva-Barreiro, Acoruña (ES); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 239 days.

(21) Appl. No.: 16/875,115

(22) Filed: May 15, 2020

(65) Prior Publication Data

US 2020/0374647 A1 Nov. 26, 2020

(30) Foreign Application Priority Data

May 24, 2019 (GB) ...................................... 1907389

(51) Int. Cl.
*H04S 7/00* (2006.01)
*G06T 17/00* (2006.01)
(Continued)

(52) U.S. Cl.
CPC .............. *H04S 7/303* (2013.01); *G06T 17/00* (2013.01); *G06V 40/171* (2022.01); *H04R 1/406* (2013.01);
(Continued)

(58) Field of Classification Search
None
See application file for complete search history.

(56) References Cited

U.S. PATENT DOCUMENTS

| | | | |
|---|---|---|---|
| 2019/0082283 A1* | 3/2019 | Riggs | H04R 5/033 |
| 2020/0178014 A1* | 6/2020 | Kim | G06N 3/0454 |
| 2021/0297802 A1* | 9/2021 | Satou | H04R 5/02 |

FOREIGN PATENT DOCUMENTS

| | | |
|---|---|---|
| WO | 2016145261 A1 | 9/2016 |
| WO | 2017197156 A1 | 11/2017 |

OTHER PUBLICATIONS

Combined Search and Examination Report for corresponding GB Application No. GB1907389.9, 2 pages, dated Nov. 7, 2019.
(Continued)

*Primary Examiner* — Qin Zhu
(74) *Attorney, Agent, or Firm* — Matthew B. Dernier, Esq.

(57) ABSTRACT

A method of obtaining a head-related transfer function for a user is provided. The method comprises generating an audio signal for output by a handheld device and outputting the generated audio signal at a plurality of locations by moving the handheld device to those locations. The audio output by the handheld device is detected at left-ear and right-ear microphones. A pose of the handheld device relative to the user's head is determined for at least some of the locations. One or more personalised HRTF features are then determined based on the detected audio and corresponding determined poses of the handheld device. The one or more personalised HRTF features are then mapped to a higher-quality HRTF for the user, wherein the higher-quality HRTF corresponds to an HRTF measured in an anechoic environment. This mapping may be learned using machine learning, for example. A corresponding system is also provided.

14 Claims, 13 Drawing Sheets

(51) Int. Cl.
*G06V 40/16* (2022.01)
*H04R 1/40* (2006.01)
*G01S 5/16* (2006.01)

(52) U.S. Cl.
CPC ....... *H04R 2499/11* (2013.01); *H04S 2420/01* (2013.01)

(56) References Cited

OTHER PUBLICATIONS

Examination Report for corresponding GB Application No. GB1907389.9, 5 pages, dated Aug. 25, 2022.

* cited by examiner

METHOD AND SYSTEM FOR GENERATING AN HRTF FOR A USER

BACKGROUND OF THE INVENTION

Field of the Invention

The present disclosure relates to a method and system for generating a head-related transfer function for a user.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

An important feature of human hearing is that of the ability to localise sounds in the environment. Despite having only two ears, humans are able to locate the source of a sound in three dimensions; the interaural time difference and interaural intensity variations for a sound (that is, the time difference between receiving the sound at each ear, and the difference in perceived volume at each ear) are used to assist with this, as well as an interpretation of the frequencies of received sounds.

As the interest in immersive video content increases, such as that displayed using virtual reality (VR) headsets, the desire for immersive audio also increases Immersive audio should sound as if it is being emitted by the correct source in an environment, that is the audio should appear to be coming from the location of the virtual object that is intended as the source of the audio; if this is not the case, then the user may lose a sense of immersion during the viewing of VR content or the like. While surround sound speaker systems have been somewhat successful in providing audio that is immersive, the provision of a surround sound system is often impractical.

In order to perform correct localisation for recorded sounds, it is necessary to perform processing on the signal to generate the expected interaural time difference and the like for a listener. In previously proposed arrangements, so-called head-related transfer functions (HRTFs) have been used to generate a sound that is adapted for improved localisation. In general, an HRTF is a transfer function that is provided for each of a user's ears and for a particular location in the environment relative to the user's ears. Generally speaking, the HRTF is a response that characterizes how an ear receives a sound from a point in space.

HRTFs are typically measured in an anechoic chamber so as to reduce the influence of early reflections and reverberation on the measured response. An anechoic chamber is a chamber that has been designed so as to be free from echo (although this may not be completely achieved in reality). Whilst anechoic chambers allow for accurate HRTF measurements, the use of such chambers is often time-consuming and expensive. To alleviate this problem, HRTFs are usually measured for a select few test subjects and then matched or adapted to other subjects, based on e.g. correlations between anatomical features of subjects and the corresponding HRTFs. Whilst HRTFs generated in this way may be sufficiently accurate for some purposes, there is still room for improvement. The present disclosure seeks to address or at least alleviate some of the problems associated with previously proposed personalised HRTF generation techniques.

SUMMARY

The present disclosure is defined by the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
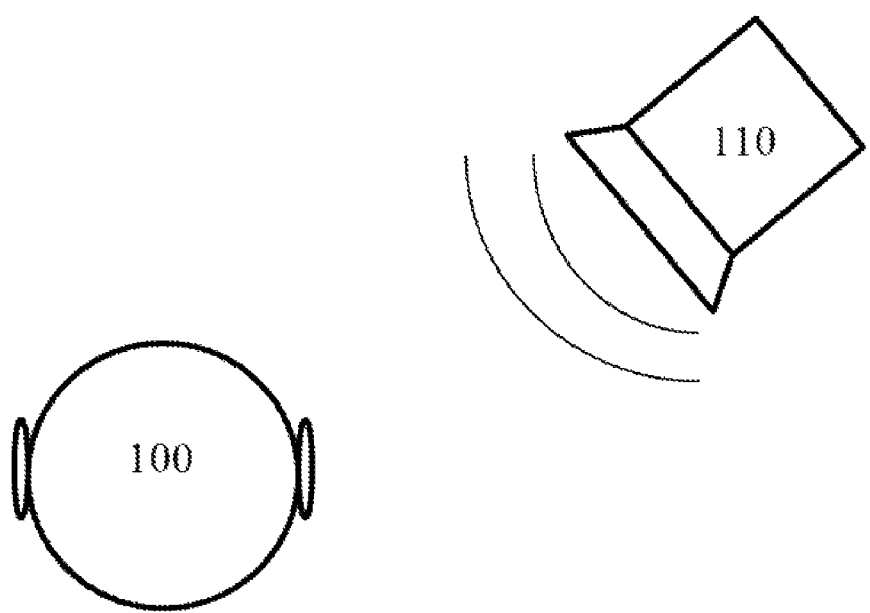
FIG. 1 schematically illustrates a user and sound source.

Referring now to the drawings, wherein like reference numerals designate identical or corresponding parts throughout the several views, FIG. 1 schematically illustrates a user 100 and a sound source 110. The sound source 110 may be a real sound source (such as a physical loudspeaker or any other physical sound-emitting object) or it may be a virtual sound source, such as an in-game sound-emitting object, which the user is able to hear via a real sound source such as headphones or loudspeakers. As discussed above, a user 100 is able to locate the relative position of the sound source 110 in the environment using a combination of frequency cues, interaural time difference cues, and interaural intensity cues. For example, in FIG. 1 the user will receive sound from the sound source 110 at the right ear first, and it is likely that the sound received at the right ear will appear to be louder to the user.

For many applications, such as listening to music, it is not considered particularly important to make use of an HRTF; the apparent location of the sound source is not important to the user's listening experience. However, for a number of applications the correct localization of sounds may be more desirable. For instance, when watching a movie or viewing immersive content (such as during a VR experience) the apparent location of sounds may be extremely important for a user's enjoyment of the experience, in that a mismatch between the perceived location of the sound and the visual location of the object or person purporting to make the sound can be subjectively disturbing. In such embodiments, HRTFs are used to modify or control the apparent position of sound sources.

Figure 2:
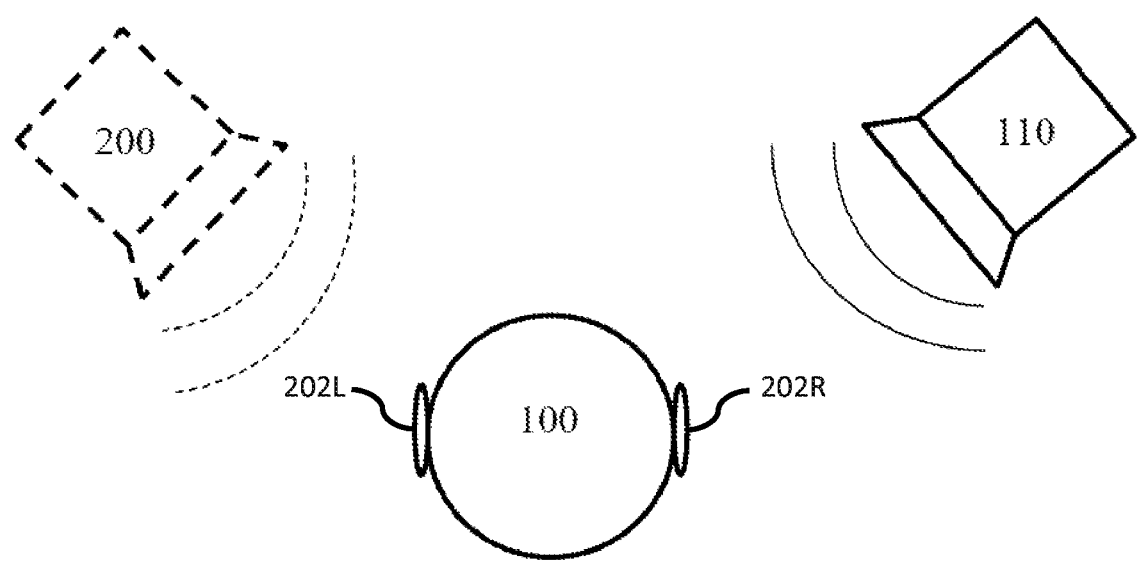
FIG. 2 schematically illustrates a virtual sound source.

FIG. 2 illustrates a virtual sound source 200 that is located at a different position to the sound source 110. It is apparent that for the user 100 to interpret the sound source 200 as being at the position illustrated, the received sound should arrive at the user's left ear 202L first and have a higher intensity at the user's left ear than the user's right ear 202R. However, using the sound source 110 means that the sound will instead reach the user's right ear 202R first, and with a higher intensity than the sound that reaches the user's left ear 202L, due to being located to the right of the user 100.

Figure 3:
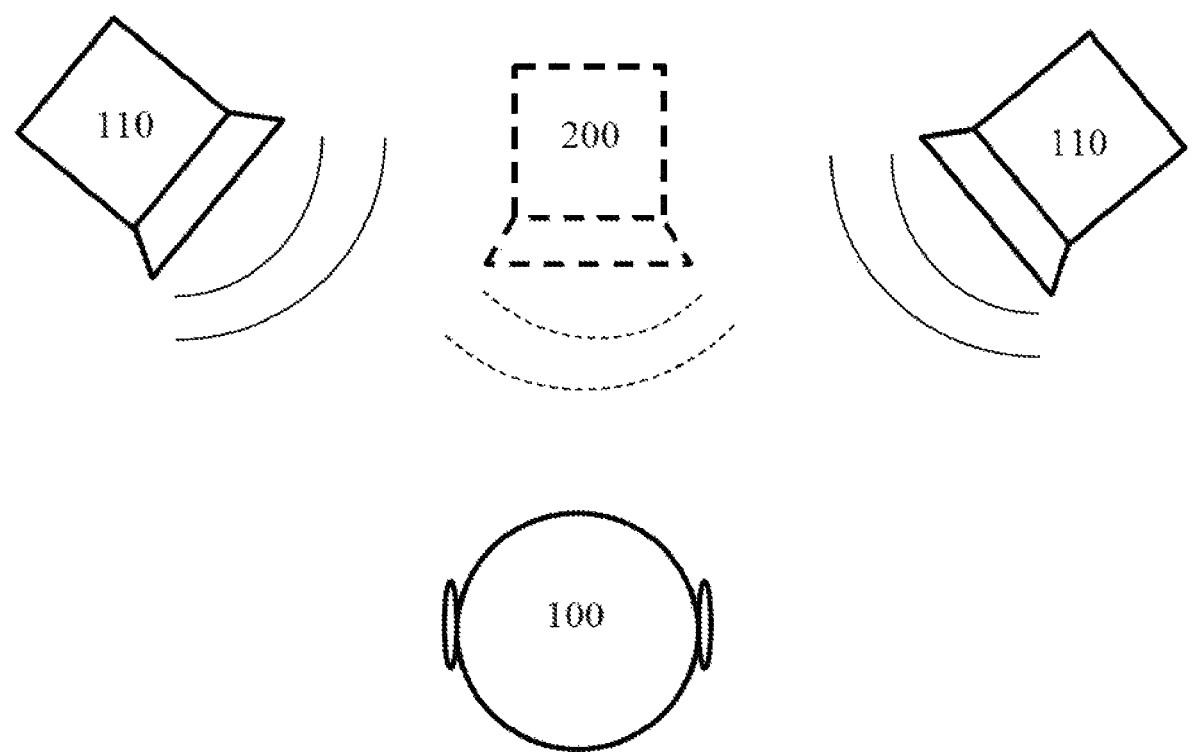
FIG. 3 schematically illustrates sound sources generating audio for a virtual sound source.
Figure 4:
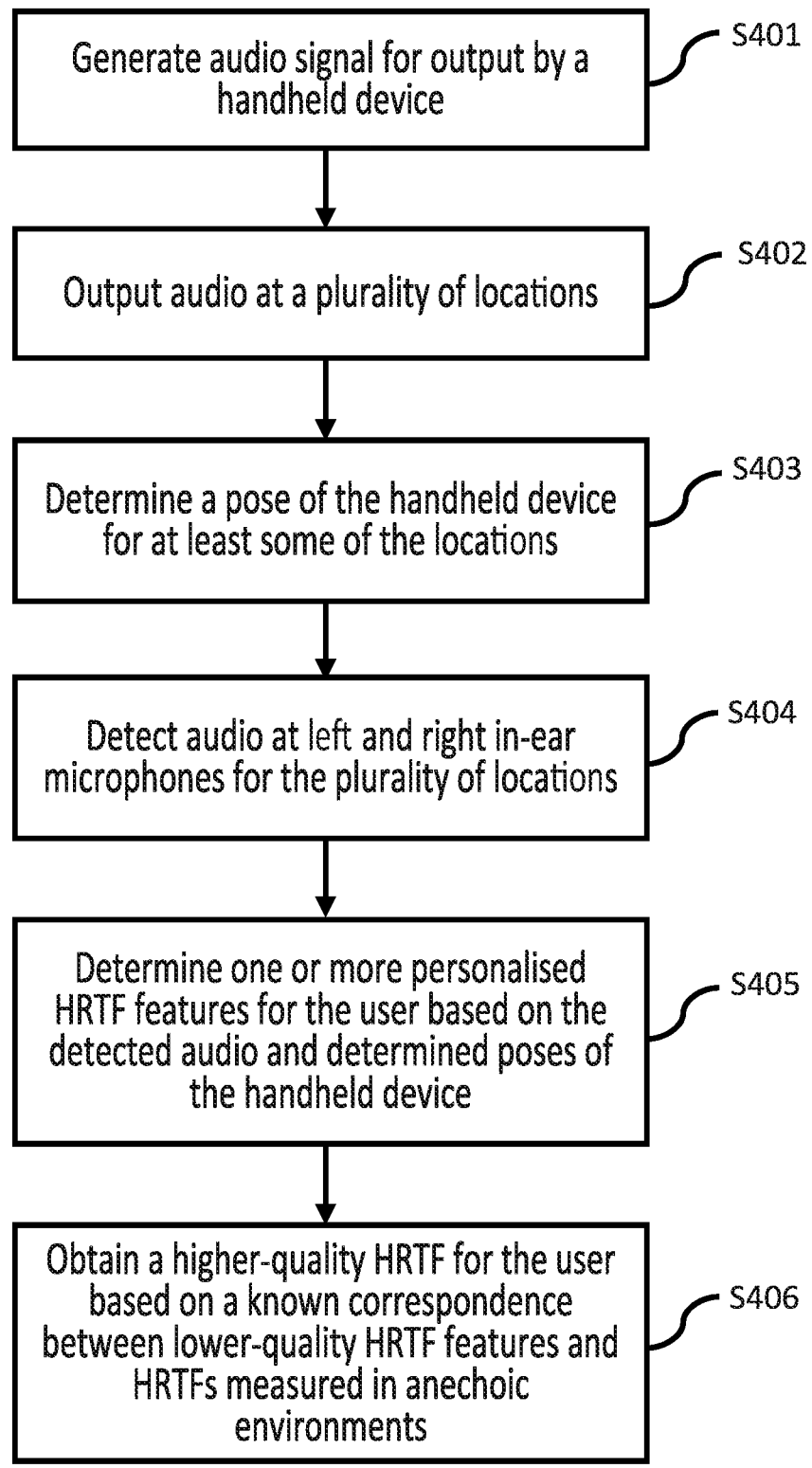
FIG. 4 is a schematic flowchart illustrating an HRTF generation method.

An array of two or more loudspeakers (or indeed, a pair of headphones) may be used to generate sound with a virtual source location that is different to that of the loudspeakers themselves. FIG. 3 schematically illustrates such an arrangement of sound sources 110. By applying an HRTF to the sounds generated by the sound sources 110, the user 100 may be provided with audio that appears to have originated from a virtual sound source 200. Without the use of an appropriate HRTF, it would be expected that the audio would be interpreted by the user 100 as originating from one/both of the sound sources 110 or another (incorrect for the virtual source) location.

It is therefore clear that the generation and selection of high-quality and correct HRTFs for a given arrangement of sound sources relative to a user is of importance for sound reproduction.

One method for measuring HRTFs is that of recording audio received by in-ear microphones that are worn by a user located in an anechoic (or at least substantially anechoic) chamber. Sounds are generated, with a variety of frequencies and sound source positions (relative to the user) within the chamber, by a movable loudspeaker. The in-ear microphones are provided to measure a frequency response to the received sounds, and processing may be applied to generate HRTFs for each sound source position in dependence upon the measured frequency response. Interaural time and level differences (that is, the difference between times at which each ear perceives a sound and the difference in the loudness of the sound perceived by each ear) may also be identified from analysis of the audio captured by the in-ear microphones.

The generated HRTF is unique to the user, as well as the positions of the sound source(s) relative to the user. However, the generated HRTF may still serve as a reasonable approximation of the correct HRTF for another user and one or more other sounds source positions. For example, the interaural time difference may be affected by head/torso characteristics of a user, the interaural level difference by head, torso, and ear shape of a user, and the frequency response by a combination of head, pinna, and shoulder characteristics of a user. While such characteristics vary between users, the variation may be rather small in some cases and therefore it can be possible to select an HRTF that will serve as a reasonable approximation for the user in view of the small variation.

In order to generate sounds with the correct apparent sound source position, an HRTF is selected based upon the desired apparent position of the sound source (in the example of FIG. 3, this is the position of the sound source 200). The audio associated with that sound source is filtered (in the frequency domain) with the HRTF response for that position, so as to modify the audio to be output such that a user interprets the sound source as having the correct apparent position in the real/virtual environment.

It would be desirable if personalized HRTFs could be generated for users, without the need for expensive equipment and facilities, such as those typically found in an anechoic chamber. Moreover, it would be desirable if HRTFs could be generated for users in a timely manner, without requiring a user to have to sit still in anechoic chamber for prolonged periods. A method for generating such HRTFs will now be described in relation to FIGS. 4-11.

At a first step S401 an audio signal for output by a handheld device is generated. The handheld device may correspond to e.g. a smartphone device, games controller, tablet device, smartwatch, etc. The audio signal may be generated in response to a user initiating the HRTF generation process via an application running at the handheld device or a computing device in communication with the handheld device. The handheld device may comprise one or more speakers for outputting the generated audio signal. The handheld device may be operable to output a plurality of audio signals, each audio signal having a different frequency.

At a second step S402, the generated audio signal is output by the handheld device. The audio signal is output at a plurality of locations by the handheld device being moved to those locations. The handheld device may be moved to the plurality of locations by the user, e.g. by the user gripping the device with their hand and moving the device to the different locations. The audio signal may be output continuously as the handheld device is moved to the different locations or discretely, i.e. at discrete locations that the handheld device has been moved to.

In some examples, the user is guided to move the handheld device such that the plurality of locations correspond to different elevations (attitudes) and azimuth angles relative to the user. For example, if the handheld device is a smartphone, a visual indicator may be displayed at the screen of the smartphone, indicating a direction or pattern in which the smartphone is to be moved. Generally, the handheld device may provide visual or haptic feedback to indicate that the user has moved the handheld device to the correct location and or that the handheld device needs to be moved to a different location.

In examples where the handheld device is operable to output a plurality of audio signals, the user may be guided to move the handheld device to the plurality of locations, for each audio signal. For example, a user may perform a first movement for a first signal, and then the same movement for a second signal at a different frequency to the first. This may be repeated, depending on the number of frequencies for which the one or more personalised HRTF features are to be determined.

The distance at which the user is to hold their phone away from them may also be indicated to the user. Generally, the user's arm will need to be extended to ensure that there is a measurable delay in the audio reaching each of the user's ears. Thus, the user may be presented with an indicator, indicating that they need to move the handheld device further away from or towards them, during the HRTF generation process. It is expected that the user will hold the handheld device at a distance of 1 metre or less from their body, thus corresponding to the measuring of personalised HRTF features in the near-field.

It will be appreciated that if the user is to move the handheld device themselves, there will be locations for which the user may struggle to position the handheld device at, e.g. behind their head. For these locations, the user may be guided to move their head relative to the sound source, such that the relative location of the handheld device corresponds to the sound source being located behind the user.

At a third step S403, a pose of the handheld device relative to the head under test for at least some of the locations at which audio is output by the handheld device, is detected. The head under test may correspond to the head of the user. Alternatively, the head under test may correspond to the head of a dummy, that approximates the size and shape of the user's head (e.g. a 3D print of their head). For brevity, the present disclosure will focus primarily on embodiments in which an HRTF is being measured by an actual user, but it will be appreciated that the same or corresponding techniques may be used for measuring the HRTF for an artificial subject.

The pose of the handheld device may provide an indication of the azimuth and elevation of the handheld device (the sound source), relative to the head under test. Generally, the HRTF of a user will be a function of at least the elevation, azimuth and frequency of the sound source. Therefore, the relative pose of the sound source will need to be detected, when measuring the one or more personalised HRTF features for the user. Here the term pose refers to the position and or orientation of the handheld device relative to the head under test, and in some examples, the ears of the head under test.

The pose of the handheld device relative to the head under test may be determined using one or more of e.g. a GPS sensor, accelerometer, gyroscope incorporated into the handheld device. For example, the pose of the device relative to the user's head (and/or ears) may be detected for a reference pose, and detected changes in the pose of the handheld device may be used to infer a pose of the device relative to the user's head (and/or ears). In some examples, it may be that the relative pose of the user's ears can be estimated based on a determined pose of the user's head relative to the handheld device (e.g. by estimating where the ears are likely to be relative to a detected head position and/or orientation). The pose of the handheld device may also be predicted based on e.g. an expected arm-length of the user, which may be estimated from e.g. photos of the user or other information available from the user's social media. The head orientation, or at least changes in the head orientation from an initial reference pose, can be detected for example using a camera on the handheld device or a separate camera.

In some examples, the handheld device may be operable to capture images of the user at the plurality of locations, and the pose of the device relative to the user's head and/or ears may be inferred from the appearance of the user in the captured images. For example, changes in the size and shape of the user's face (and/or ears) in the captured images may provide information as to how the camera is positioned and oriented relative to the user's face (and/or ears). It may be, for example, that the size and shape of the user's face and/or ears is known for a reference pose, and changes in the size and shape of the user's face and/or ears can be mapped to corresponding changes in relative pose of the handheld device.

Alternatively, or in addition, the handheld device may comprise a depth sensor, such as e.g. a structure-light sensor, time-of-flight sensor, stereoscopic camera. The pose of the handheld device relative to the user's head (e.g. distance from their face) and/or ears may be further determined based on the depth data captured by the depth sensor.

It will be appreciated that, whilst step S403 is shown as coming after step S402, the pose of the handheld device relative to the user may be determined as and when the handheld device is moved. As will be appreciated, it is possible that the user will not keep their head still whilst moving the handheld device to each of the plurality of locations, and so any changes in position and orientation of the user's head may be detected, for each location at which audio is to be output by the handheld device.

In some examples, the pose of the handheld device relative to the head under test may be tracked separately, using a separate camera that does not form part of the handheld device. The separate camera may be configured to capture images of the user holding the handheld device, and the images may be processed so as to determine a pose of the handheld device relative to the user's head and/or ears. The camera may correspond to e.g. webcam, PS Camera™, a camera attached to an HMD, etc.

It will be appreciated that the pose of the handheld device relative to the user's body (e.g. shoulders, torso, etc.) may also be determined, using any of the above described techniques.

It will also be appreciated that, in examples where images of the user's head and/or ears are captured, there may be a preliminary step of identifying within those images, specific regions as corresponding to e.g. the head and/or ears of the user, such that the pose of the device relative to a specific portion of the user's body can be determined.

As mentioned previously, there may be locations for which the user is unable to easily move the handheld device to, such as e.g. behind their head, or at locations further away than arm's length. Hence, in alternative or additional examples, the user may be prompted to place the handheld device (the sound source) at a given location in the room, and to move their head relative to the handheld device placed at that location. This may involve, for example, tracking the pose of the user relative to the handheld device (e.g. with a camera that forms part of the handheld device, or a separate camera), and guiding the user to move their head to a give position and orientation, for which the audio output by the handheld device is to be detected. The audio may be output by the handheld device for each change in location of the user relative to the handheld device.

At a fourth step S404 the audio output by the handheld device is detected at a pair of microphones. The microphones are for location at (in use or in operation of the method(s) discussed here, disposed at) positions corresponding to the left and right ears of the head under test. That is, the microphones are suitable for locating at positions corresponding to the left and right ears of the head under test; which is to say, for example, at least partly in the ears, at least partly over the ears, at least partly around the ears or the like.

The microphones may be shaped so as to be fitted into the ears of a user. For example, the microphones may comprise a portion that tapers at one end, with the tapered end corresponding to the end that is to be inserted into the ear canal of the user. The microphone may be located at the opposite end of the tapered end. Alternatively or in addition, each microphone may comprise e.g. a clip for securing the microphones over a user's ears, such that at least some of the microphone is in alignment with the user's ear canal. The clip may hook over a user's ear, or e.g. nestle within the pinna. In some examples, the microphones may have a deformable portion for inserting and fitting into the ear canal of the user.

In the art, microphones that can be worn in and/or over the ears of a user are sometimes referred to as 'in-ear microphones'. Typically, these types of microphone comprise a portion (corresponding to the audio detecting surface) that is outward facing when being worn by a user. As will be appreciated, it is generally desirable for these headphones to be of a small size so as to not, or at least weakly, interfere with (for example change, by virtue of blocking and/or reflection) the audio that is to be detected. The shape of the microphones may provide an indication of a configuration in which they are intended to be worn. For example, the microphones may comprise an elongate member that fits over and/or within a portion of the user's ear in a tight-fitting manner, when being worn in the intended manner.

In some examples, the microphones are located with respect to the user's ears (or dummy head ears as discussed below) at locations which at least approximate the location of an audio transducer such as a headphone transducer which is used (during audio reproduction) to reproduce audio for a user.

The microphones may be connected to a source of audio (e.g. the handheld device) via a wired or wireless connection. If a wired connection is used, the wire may provide a further means for securing the microphone to the user's ear (e.g. by looping over and around the back of the ear). In some examples, the microphones may be directional, i.e. being more sensitive to audio signals detected from a particular direction or angular range, such as directions corresponding to in front of the user. In other examples, the microphones may be so-called omnidirectional microphones. This term does not necessarily imply an equal or substantially equal audio response in all directions, but rather a substantially equal audio response in all or substantially all directions which may be considered as outwards relative to the head with respect to which the microphone is being worn or mounted.

In some examples, the microphones will have been positioned over and/or in a user's ears prior to the outputting of the audio signal by the handheld device. However, in some examples, the microphones may be fitted onto and/or into ear formations of an artificial dummy, with the dummy having physical formations similar to those of ears, approximating the physical shape of a human's ears. In such an example, microphones similar to those discussed above for use with human subjects may be mounted in or on the physical ear formations. In other examples, the microphones may be disposed in the dummy head, for example along a physical formation similar to an ear canal in a human, at locations which would be inaccessible if a human subject's head were in use. In some situations, it may be more convenient to measure the HRTF for a dummy so as to predict an HRTF for a corresponding human. Hence the positions of the microphones may correspond to the positions of a user's ear canals, but not necessarily be fitted to the actual user.

At a fifth step S405, one or more lower quality HRTF features for the head under test are generated based on the audio signal detected at the respective microphones and the determined poses of the handheld device. The reasons for the one or more personalised HRTF being considered as a lower quality will be described later (see section: '*Mapping the low-quality HRTF features to a high-quality HRTF*'). The one or more lower quality HRTF features may be determined based on features of the audio signal detected at the left and right microphones being worn by the user (or secured to the head of a dummy user). The one or more lower quality HRTF features may be considered to be personalised HRTF features in the sense that they have been measured for a specific user (or a dummy representing a specific user or subset of users).

In the present disclosure, the features derived from the audio signal detected at the in-ear microphones are referred to as audio features. The one or more lower quality HRTF features may further be generated based on anatomical features of the user which have been derived independently from the detected audio, as will be described later.

Audio Features

In some examples, generating the one or more lower quality HRTF features for the head under test may involve, for example, determining the interaural time difference (ITD) for a plurality of poses of the handheld device (which corresponds to the pose of the sound source). The interaural time difference may be estimated as the delay between the left and right signal peaks in the audio signal detected at the respective in-ear microphones. The interaural time difference may be measured for each of plurality of locations that the handheld device is moved to. By measuring the ITD at the plurality of locations, the ITD can be recreated for an artificial sound source at a corresponding location in a virtual environment.

Figure 5:
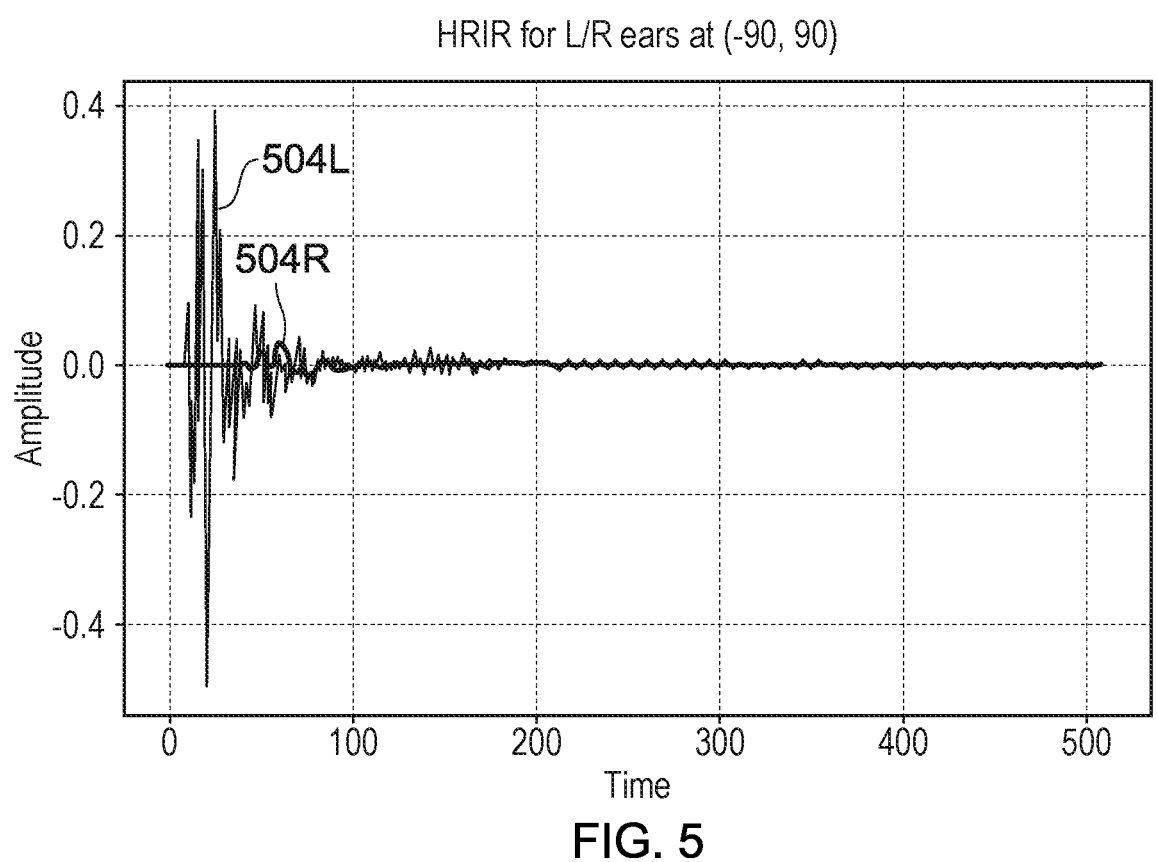
FIG. 5 shows an example of the interaural time difference of an audio signal detected at a pair of in-ear microphones.
Figure 6:
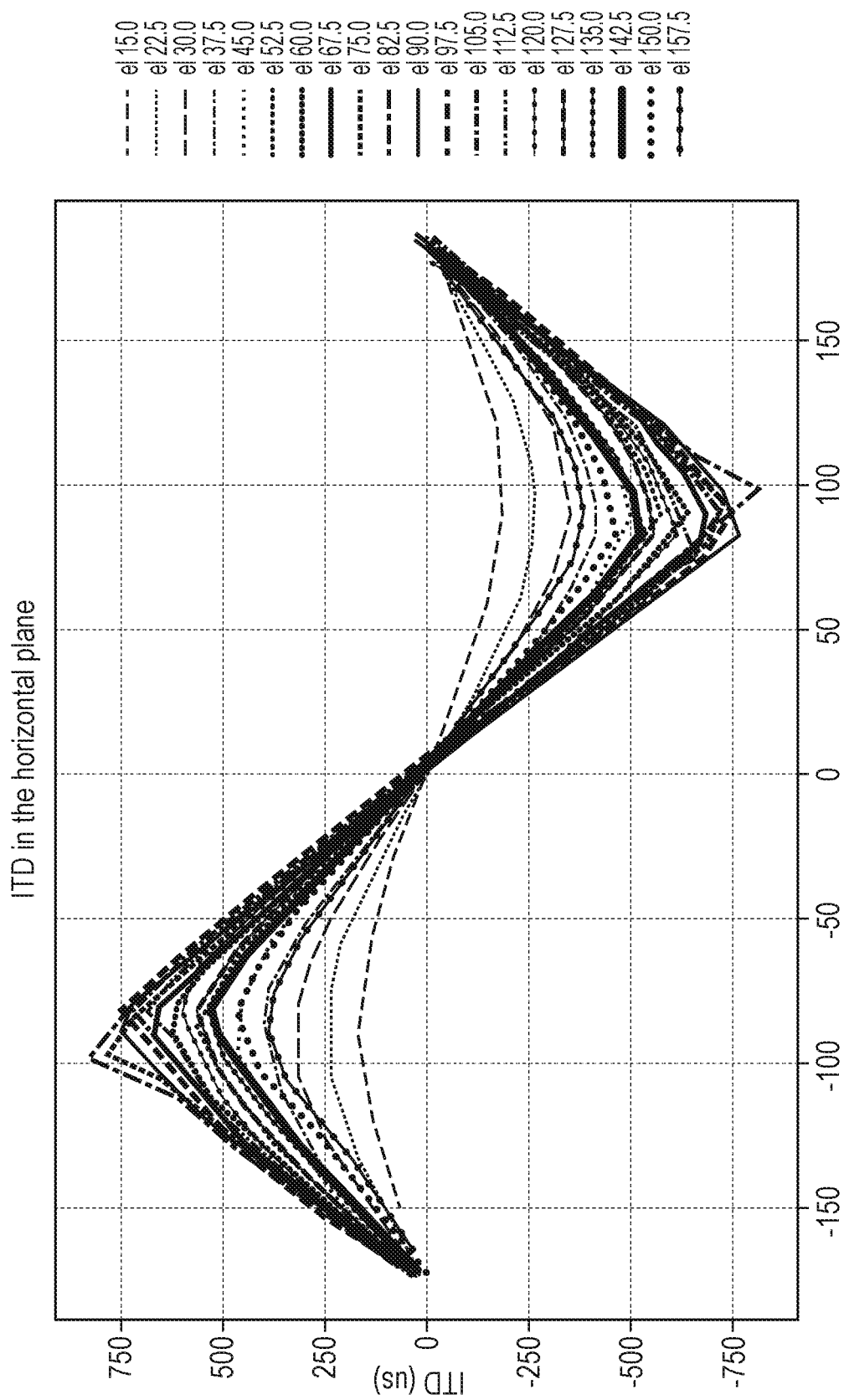
FIG. 6 shows an example of the interaural time difference of a detected audio signal in the horizontal plane as a function of azimuth angle for a plurality of different elevations of the sound source.

An example of the audio signal detected by the left and right in-ear microphones is shown in FIG. 5. In FIG. 5, the amplitude of the signal detected at the left and right in-ear microphones as a function of time represents the Head-Related Impulse Response (HRIR) for a given elevation and azimuth angle. The signals detected at the left and right in-ear microphones are shown in FIG. 5 as signals 504L and 504R respectively. FIG. 6 shows an example of the ITD measured for at a plurality of elevations and azimuth angles. In FIG. 6, each plot corresponds to the ITD measured at a given elevation, as a function of azimuth angle.

In some examples, the ITD may be determined as the delay at which the cross-correlation between the HRIRs is maximum. The cross-correlation function may be applied to the time-domain impulse responses, and the index at which the maximum occurs calculated. This index may then be converted from samples to time using e.g. the sampling rate of the signal.

In other examples, the audio signals detected at the in-ear microphones (corresponding to the HRIR) may be converted into the frequency domain, using a fast Fourier transform (FFT), thus converting the HRIRs into corresponding HRTFs. The ITD may then be determined by applying the cross-correlation function to the frequency-domain responses, in the same manner as that described above for the time-domain impulse responses.

Alternatively, or in addition, determining the ITD may involve converting the left and right signals to the frequency domain, and calculating, and then unrolling the phases. The excess phase components may then be obtained by computing the difference between the linear component of the phase (also known as the group delay) as extracted from the unrolled phased. The equation below illustrates this relationship, where the interaural time difference is represented by the letter 'D', the frequency of the output sound is 'k' and 'H(k)' represents the HRTF for the frequency k. 'i' signifies an imaginary number, while 'φ' and 'μ' represent functions of the frequency k.

$$H[k] = |H[k]| \underbrace{e^{-(\mu[k])}}_{\text{Minimum Phase}} \underbrace{e^{-i(2\pi D/N)}}_{\text{Excess Phase}} \quad \text{Equation 1}$$

Figure 7:
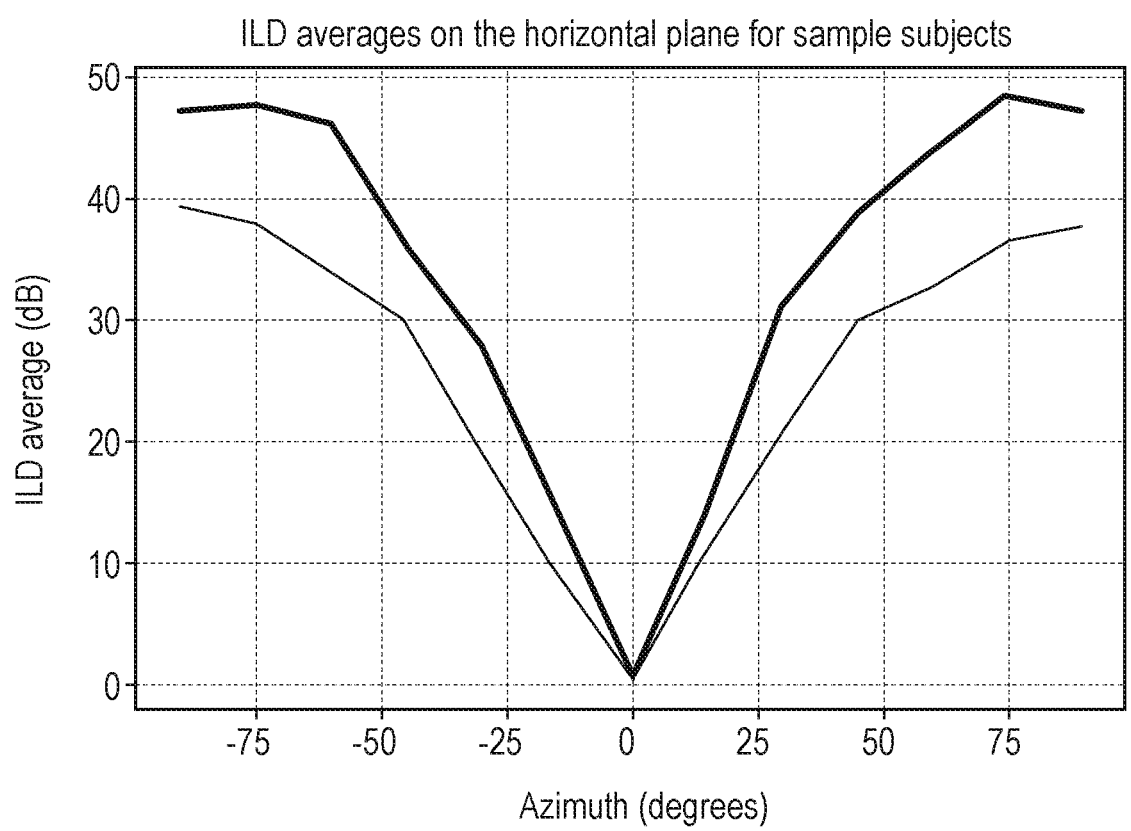
FIG. 7 shows an example of the interaural level difference of a detected audio signal as a function of azimuth angle for two different test subjects.

The step of generating one or more lower quality HRTF features for the user may also involve determining an interaural level difference (ILD) for the user. That is, a difference in loudness of the audio signal detected at the left and right in-ear microphones, for a given pose of the sound source. The ILD is an important binaural cue for localisation of sounds from around 1 kHz in the horizontal plane and is affected by the head, torso and ear shape of the listener. By measuring the ILD for a plurality of poses, the ILD can be recreated for a virtual sound source located at corresponding poses (relative to the user). As can be seen in FIG. 7, the shape of the ILD for each subject is relative similar, but each user has different maxima. In FIG. 7, the ILD for each subject is shown as a function of azimuth angle.

Figure 8:
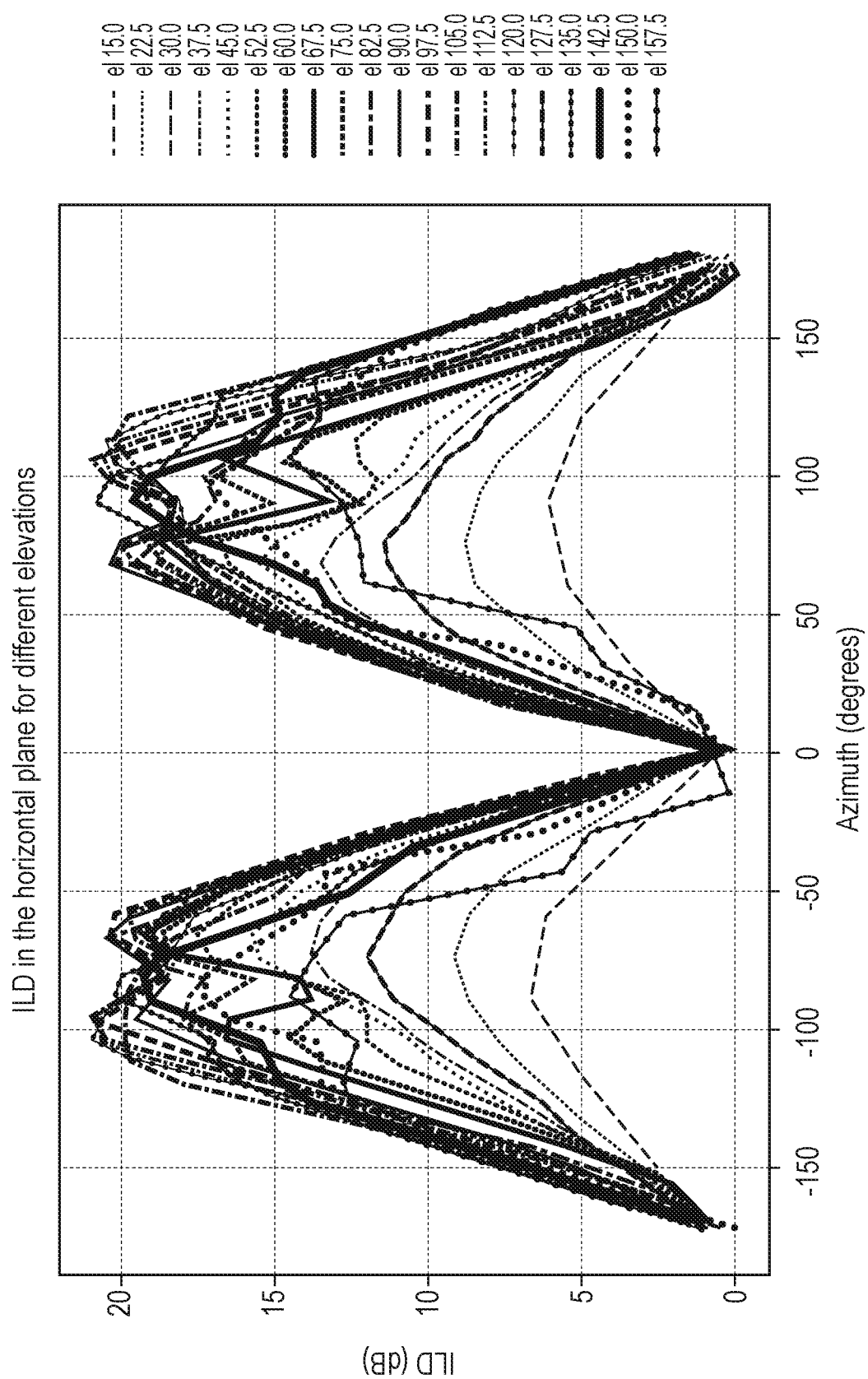
FIG. 8 shows an example of the relationship between interaural level difference as a function of azimuth for a plurality of different elevations.

FIG. 8 shows an example of the ILD measured for a plurality of different of spatial locations. In FIG. 8, each plot corresponds to the ILD measured at a different respective elevation, as a function of azimuth angle.

The step of generating one or more lower quality HRTF features for the head under test may also involve determining one or more spectral cues for the user. The spectral cues may correspond to one or more peaks and notches in the amplitude-frequency response of the audio signal detected at the left and right in-ear microphones. The first pinna-notch (Fpn) is an example of such a notch that may be measured for the user. Spectral cues from multiple peaks and notches are characteristic of different 3D regions and contribute to a user's ability to spatially disambiguate sound sources.

The one or more spectral cues may be measured for each location at which audio is output by the handheld device. In this way, the spectral cues may be measured for a user at those locations. This information may also be used to estimate the response for other positions too, based on the measured spectral cues. For example, it may be possible to estimate how the peaks and notches in the spectrum will vary as a function of distance, elevation and azimuth, for locations at which the audio response was not measured, based on the audio response that was measured.

Figure 9:
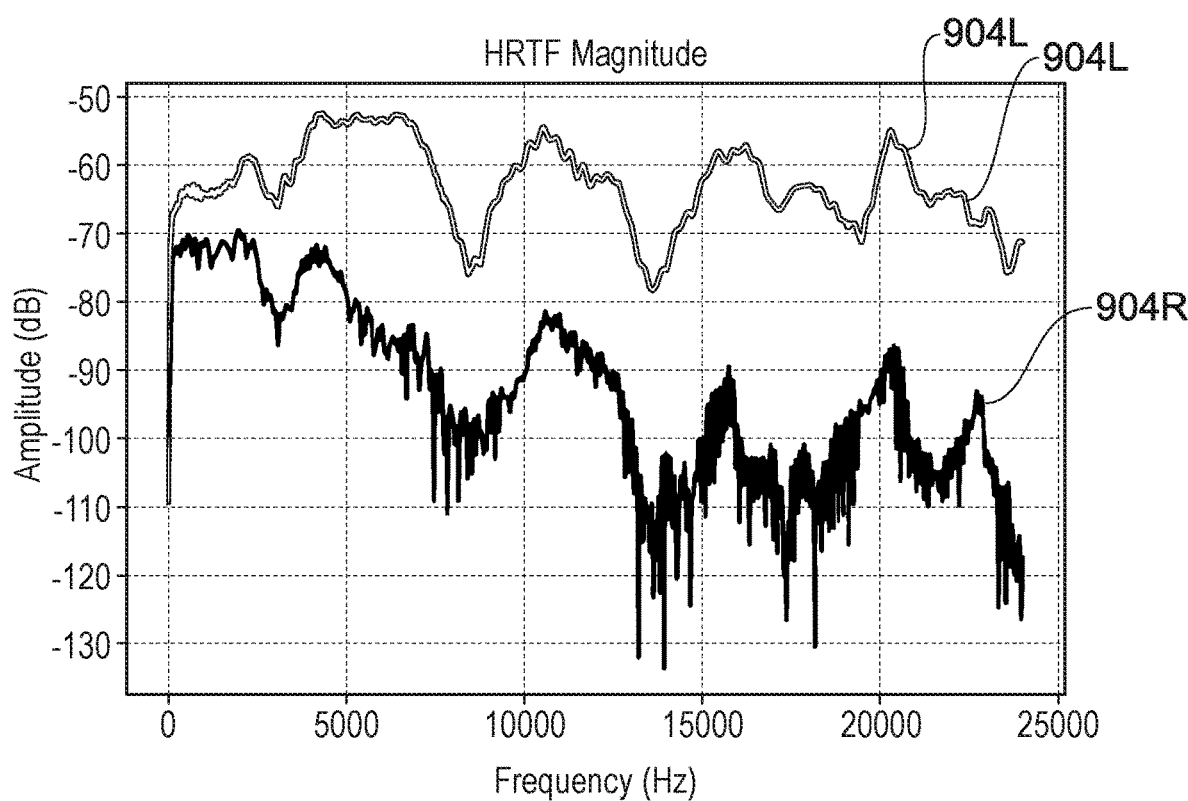
FIG. 9 shows an example of an amplitude curve for an audio signal detected at left and right in-ear microphones being worn by a user.

FIG. 9 shows an example of the amplitude-frequency response of an audio signal detected at left and right in-ear microphones for a plurality of different frequencies, for a given azimuth and elevation of the sound source.

Figure 10:
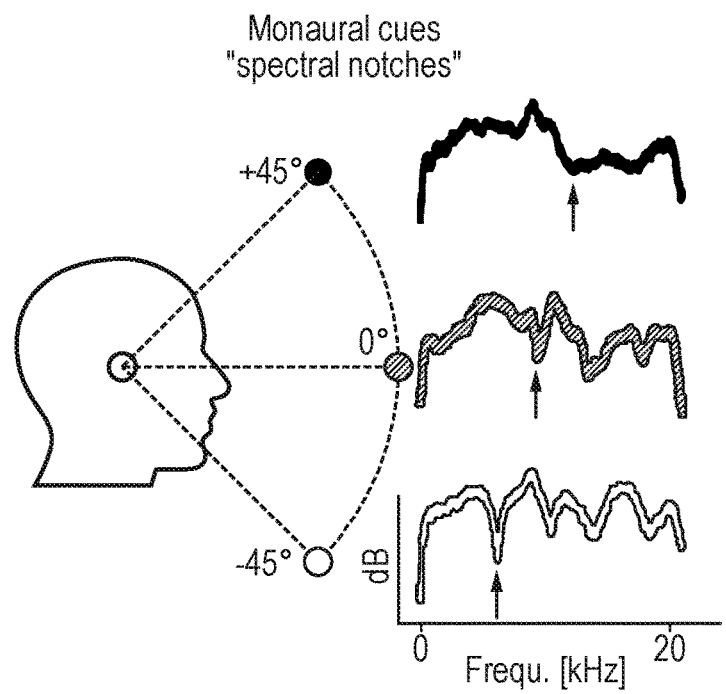
FIG. 10 shows schematically an example of the location of spectral cues in a detected audio signal as a function of elevation of the sound source.

FIG. 10 illustrates the relationship between the relative location of spectral cues within a detected audio signal and the position of the sound source relative to the user. As can be seen in FIG. 10, the location of the peaks and notches in the amplitude-frequency response are sound-source position dependent. In FIG. 10, the position of the first pinna-notch (indicated by the arrow) is shown as shifting to higher frequencies for increased elevations of the sound source. Hence, the pose of the handheld device (the sound source) will need to be known or detected when the amplitude-frequency response is being measured. This ensures that the same amplitude-frequency response is generated for virtual sound sources at a corresponding location.

As mentioned previously, the user may be guided to move their handheld device in a pre-determined pattern, whilst the handheld device outputs audio at a given frequency. The user may then be prompted to repeat the motion, whilst the handheld device outputs audio at a different frequency. In some examples, the user will be prompted to move the handheld device such that the plurality of locations correspond to different elevations, azimuth angles and distances of the sound source, relative to the user. The user may be alerted once spectral cues have been determined for a sufficient number of elevation and azimuth angles.

As will be appreciated, there will be multiple locations that correspond to the audio source being equidistant from both ears (the so-called 'cone of confusion'). For these locations, the ITD and ILD measured may be identical or substantially similar, and so recreating a virtual sound with these ITDs and ILDs may not enable a user to accurately locate that sound. Hence, in some examples, step S405 may comprise determining an ITD, ILD and one or more spectral cues, for each location of the handheld device (relative to the user) at which audio is output. This ensures that virtual sounds will be perceived by a user as originating from a specific point in 3D space.

To summarise, generating the one or more lower quality HRTF features for the user may involve determining, for a plurality of (relative) poses of the handheld device at which audio is output by the handheld device, one or more of:

an interaural time difference (ITD) of the audio signal detected at the left and right in-ear microphones;

an interaural level difference (ILD) of the audio signal detected at the left and right in-ear microphones;

one or more spectral cues of the audio signal detected at the left and right in-ear microphones.

This data may then be used to obtain a high-quality HRTF for the user, based on a correspondence between HRTF features measured in non-anechoic environments (e.g. the user's home) and HRTF features measured in anechoic environments (e.g. an anechoic chamber). This will be described further, later. In some examples, all three are measured for a plurality of sound source locations, thus enabling a sound to be recreated at a desired location in a virtual 3D environment.

It will be appreciated that, whilst the method above has been primarily described in relation to microphones fitted on and/or in a user's ear (i.e. in-ear microphones), the microphones may be attached over and/or in the artificial ears of a dummy. Moreover, there may be portions of the microphones that are located outside of the ears (real or artificial), such as e.g. wires, an upper surface of the microphone, any clips associated therewith, etc.

Anatomical Features

In some examples, generating the one or more lower quality HRTF features may involve obtaining user information indicative of one or more anatomical features of the user. The one or more anatomical features of the user may correspond to the size and shape of the user's ear, as well as the size and shape of their head and optionally, body. It is generally known in the art that the size and the shape of a listener's ears, head and body will determine how the sound from a sound source at a given location will be perceived by a listener. Thus, it may be possible to estimate how a user will perceive a sound source at a given location if a relationship between anatomical features and this perception is known in advance. In some examples, it may be that e.g.

the ITD, ILD and or spectral cues for a user, for a given sound source location can be estimated, based on the anatomical features of the user.

In some examples, the method may comprise obtaining information regarding the size and shape of the user's ears, and optionally head and body, in order to generate lower quality HRTF features for the user. This information may include, for example, the relative position of the ear canal, the shape of the pinna, the size of the ears, the position of the user's ears relative to the rest of their head, the size of their head, the size and or shape of their body, etc. The one or more lower quality HRTF features may be determined based on a known correlation between one or more anatomical features of the user and corresponding lower quality HRTF features.

In some examples, the relevant anatomical information may be obtained by capturing a plurality of images of each of the user's ears. For example, the handheld device may comprise a camera, and the images or video captured by the handheld device may be used to determine the size and shape of the user's ears, as well as the relative size and shape of the user's head and optionally torso. It is generally expected that images captured at e.g. arm's length will include at least the user's head and upper body. The handheld device may be configured to capture images simultaneously with the output of audio, as the handheld device is moved to the plurality of different spatial locations.

In some examples, the captured images or video may be used to generate a 3D reconstruction of the user's ear. For example, the handheld device may comprise a depth sensor (time-of-flight sensor, structured light sensor, stereoscopic camera) operable to capture depth data pertaining to the user's ear from which a 3D reconstruction of the user's ear can be generated. Once a reconstruction of the user's ear has been generated, the relevant 3D features of the ear may be extracted and used to generate one or more lower quality HRTF features for the user. Again, the one or more lower quality HRTF features for the user may be determined based on a known relationship between anatomical features and lower quality HRTF features (e.g. a mapping between pinna size and shape, and corresponding spectral cues). The captured images may also be used to generate a 3D reconstruction of the user's head, shoulders, upper body, etc., if present in the captured images.

It will be appreciated that, in some examples, the images of the user's ear(s) may be captured by a device that is separate from the handheld device. For example, it may be that the user has a second camera device, e.g. on their laptop, or as part of a video games unit, that is used to capture the images of the relevant anatomical features. The images captured by that device may then be processed, to extract the relevant information about the user's ears (and optionally head and body). Again, an external depth sensor (separate from the handheld device) may be used to generate a 3D reconstruction of the user's ears.

In some examples, information about the size and shape of the user's head may be obtained from a wearable device, such as a head mountable display (HMD). For example, the HMD may include a strap for adjusting the fit of the HMD onto the user's head, and the extension of the strap may be detected and used to approximate a size of the user's head. It will be appreciated that, where the detected audio is also used to determine the one or more personalised HRTF features, the presence of an HMD may interfere with these measurements, and so information about the size and shape of the user's head may be obtained via the HMD, prior to the recording of the audio emitted by the handheld device. That is, the audio may be detected at the microphones, for each of the plurality of locations that the handheld device is moved to, whilst the user is not wearing the HMD.

In other examples, it may be that the audio is detected whilst the user is wearing an HMD, with information about the HMD (e.g. size, shape, thickness) being known and used to compensate for the interference introduced by the user's wearing of the HMD. In such examples, it may be that the HRTF features are only measured for certain positions of the sound source (e.g. on the sides of the user's heads) that are known to be less affected by the presence of the HMD.

In alternative or additional examples, information pertaining to the relevant anatomical features of the user may be obtained from a user profile associated with the user. That is, information regarding the size and shape of the user's ears, and optionally, their head and body may be inferred from information that is known about the use from their user profile.

The user profile may correspond to a social media profile, such as e.g. a PS profile™, Facebook™ profile, Instagram profile™, etc. that the user has allowed the HRTF generation application to access. Information regarding the relevant anatomical features of the user may be determined based on one or more of: an age of the user, a sex of the user, a location of the user, a height of the user, etc. In some examples, information regarding the mean size and shape of different people's ears (and optionally heads, and bodies) may be known for different sub-groups of the population, and information may be determined for the user, based on which of the sub-groups the user is identified as corresponding with.

In some examples, it may be that the user profile has one or more images of the user associated therewith (e.g. a profile photo), and information about the size and shape of the user's ears may be extracted from the one or more photos. This may involve, for example, processing a plurality of images of the user to determine information relating to the size and shape of the user's ears. Computer vision and or machine learning techniques may be used for identifying the user in the images and for performing this processing. In some cases, it may be that the images available are insufficient for determining information about the size and shape of the user's ears, but may provide information about e.g. the age, sex, height, location etc. of the user, from which information about user's ear-size or shape, as well as head (and possibly body) size and or shape can be inferred from e.g. a known statistical relationship It will be appreciated that information extracted from user profile images may be less accurate than user information that has been input by the user (e.g. their age, location, etc.). Thus in some examples, confidence values may be assigned to each piece of information based on the source of that information (e.g. user-input age is more reliable than age estimated from an image) and taken into account when determining the one or more personalised HRTF features for the user.

Mapping the Low-Quality HRTF Features to a High-Quality HRTF

Returning to FIG. 4, at a sixth step S406, a higher-quality HRTF is obtained based on the lower quality HRTF features generated for the head under test. The higher-quality HRTF may be obtained based on a learned correspondence between HRTF features (of a so-called lower quality HRTF) measured in non-anechoic environments (e.g. the user's home) and HRTFs measured in anechoic environments (e.g. a professional anechoic chamber). In the present disclosure, a higher-quality HRTF corresponds to an HRTF measured in an anechoic environment or to a simulation or derivation of such an HRTF, for example from a lower quality HRTF using machine learning techniques to be discussed below. Conversely, a lower-quality HRTF corresponds to an HRTF measured in a non-anechoic environment, for example an HRTF actually measured using the measurement techniques discussed above, for example in a user's home. Therefore, the terms "lower" and "higher" quality are relative terms relating to a degree of similarity to an ideal HRTF (real or notional) derived in an anechoic environment.

While an anechoic chamber may not be completely free of echo (and thus not perfectly anechoic), it is expected that the environments in which the user measures their personalised HRTF (e.g. living room, bedroom, etc.) will be considerably less anechoic compared with a studio that has been designed to be so, and so the HRTF features measured in a non-anechoic environment should be clearly distinguishable from those measured in an anechoic chamber.

In some examples, determining a higher-quality HRTF may comprise determining a plurality of higher-quality HRTFs for the head under test, each higher-quality HRTF being defined for one or more locations of a sound source. Thus, the higher-quality HRTF may correspond to a higher-quality HRTF dataset.

In some examples, obtaining the higher-quality HRTF for the head under test may involve inputting the one or more lower quality HRTF features (generated as above) to a trained machine learning model. The machine learning model may have been trained to map lower quality HRTF features to a corresponding higher quality HRTF features. The machine learning model may be trained with HRTF features determined for users in non-anechoic environments and HRTFs measured in anechoic environments (for the same or different users). The lower-quality HRTF may correspond to a first HRTF that is mapped to a second (higher-quality) HRTF based on a mapping that has been learnt via machine learning.

Obtaining the higher-quality HRTF may involve mapping the one or more lower-quality audio features to corresponding higher-quality audio features. The higher-quality audio features may correspond to audio features measured at the same locations as the lower-quality audio features. However, if lower-quality audio features are measured for a variety spatial locations (or sampled at strategically selected locations), higher-quality audio features may also be extrapolated/inferred for the locations that were not measured (including the far-field). In some examples, it may be that a higher quality HRTF (having higher quality audio features associated therewith) is selected based on a best fit with a lower-quality recording, with the higher-quality HRTF covering spatial locations for which a lower-quality recording was not measured.

The audio features measured in the non-anechoic environment will have different properties (e.g. averages, noise and stability of results), and so some prior processing may be required to stabilise the results before a higher quality HRTF is determined based on these features.

The machine learning model may be trained to map the lower-quality audio features measured for a user to corresponding higher-quality audio features for the user. In some examples, this may involve capturing lower-quality audio features for several different users, and then capturing the audio features for the same or corresponding users (or models of users) in an anechoic environment.

However, even if it is not possible to capture higher and lower quality data for the same test subjects, it will still be possible to map between the lower-quality and higher-quality features for different users, provided that there is a large enough dataset for both populations. Generally, it is expected that most of the HRTF features (ITD, ILD, spectral cues) will follow a Gaussian curve among different populations, regardless of whether they are recorded in an anechoic environment or a non-anechoic environment. A model may therefore be trained to map between the distribution of lower-quality and higher-quality audio features for a given population. For example, it may be that, the average ITD in a lower-quality recording distribution is 800 μs and 700 μs in the corresponding higher-quality recording distribution. If it is known where a subject falls on the lower-quality curve, the model can be trained to map the subject to a corresponding point on the higher-quality curve.

In some examples, the machine learning model may comprise a domain-adversarial neural network. In these examples, the source data distribution may correspond to lower-quality recordings of e.g. the ITDs, ILDs, and spectral cues measured for several different subjects. The target distribution may correspond to higher-quality HRTF features measured for several different subjects. The domain-adversarial network may be used to construct a common representation space for the lower-quality and higher-quality HRTF features, such that a mapping between the two is generated. In this way, the machine learning model is trained to determine a higher-quality HRTF for the user, based on the lower-quality recordings.

In other examples, a Generative Adversarial Network (GAN), such as the CycleGAN may be used to determine a mapping between lower-quality audio features and higher-quality audio features (see pages 1-18 of 'Unpaired Image-to-Image Translation using Cycle-Consistent Adversarial Networks', J. Zhu, et al. for an example of a CycleGAN). A CycleGAN consists in learning a mapping between two unpaired datasets by using the property of "Cycle Consistency" together with two GAN models. Given two sets A (lower quality HRTF) and B (higher quality HRTF), one generator (GENAB) is given the task to transform from A to B, and the other (GENBA) to transform from B to A. If the lower-quality and higher-quality HRTFs are measured for different subjects then the data sets will be unpaired. The training data may be derived implicitly by enforcing cycle consistency: an example 'a' in A is transformed in an example '$a_b$' in B by GENAB, then transformed to an example '$a_{ba}$' in A by GENBA. The constraint that is enforced through a loss function in the training is that the example transformed back by GENBA $a_{ba}$ is equal to the original example 'a'.

It will be appreciated that any suitably trained machine learning system may be used for mapping between the lower-quality HRTF features and a corresponding higher-quality HRTF for a user.

In other examples, it may be that the machine learning model is further trained to map information relating to anatomical features of the user, such as the size and shape of the user's ear(s) and optionally, head and torso, to a corresponding higher-quality HRTF. In such cases, the machine learning model may be trained with information relating to the size and shape of the user's ear(s) and optionally their head and torso, and higher-quality HRTFs measured for people with those ear (and or head, body) size and shapes. Thus the machine learning model may be further trained to map the anatomical information to a corresponding higher-quality HRTF, in addition to the audio features described above.

The information about the user's anatomical features may be combined with the user's audio features to provide a higher confidence model. As mentioned previously, there are known relationships between anthropomorphic metrics (e.g. size of the head, different parts of the ear and body) and HRTF features (e.g. ITD, ILD and spectral cues). However, using anatomical features in isolation may result in inaccurate HRTFs being determined for a user, due to inaccuracies in measuring or predicting the anatomical features of the user. Hence, in some examples of the present method, the anatomical information that is known for the user may be used in tandem with the audio features. The anatomical information may be used, for example, to stabilize the results, reduce inconsistencies and provide a higher quality solution than would otherwise be obtained from using the measured audio features in isolation. In some examples, a confidence value may be assigned to each input of the machine learning model, based e.g. on the source of that input and whether it deviates from a value that is expected based on other information that is known about the subject.

Figure 11:
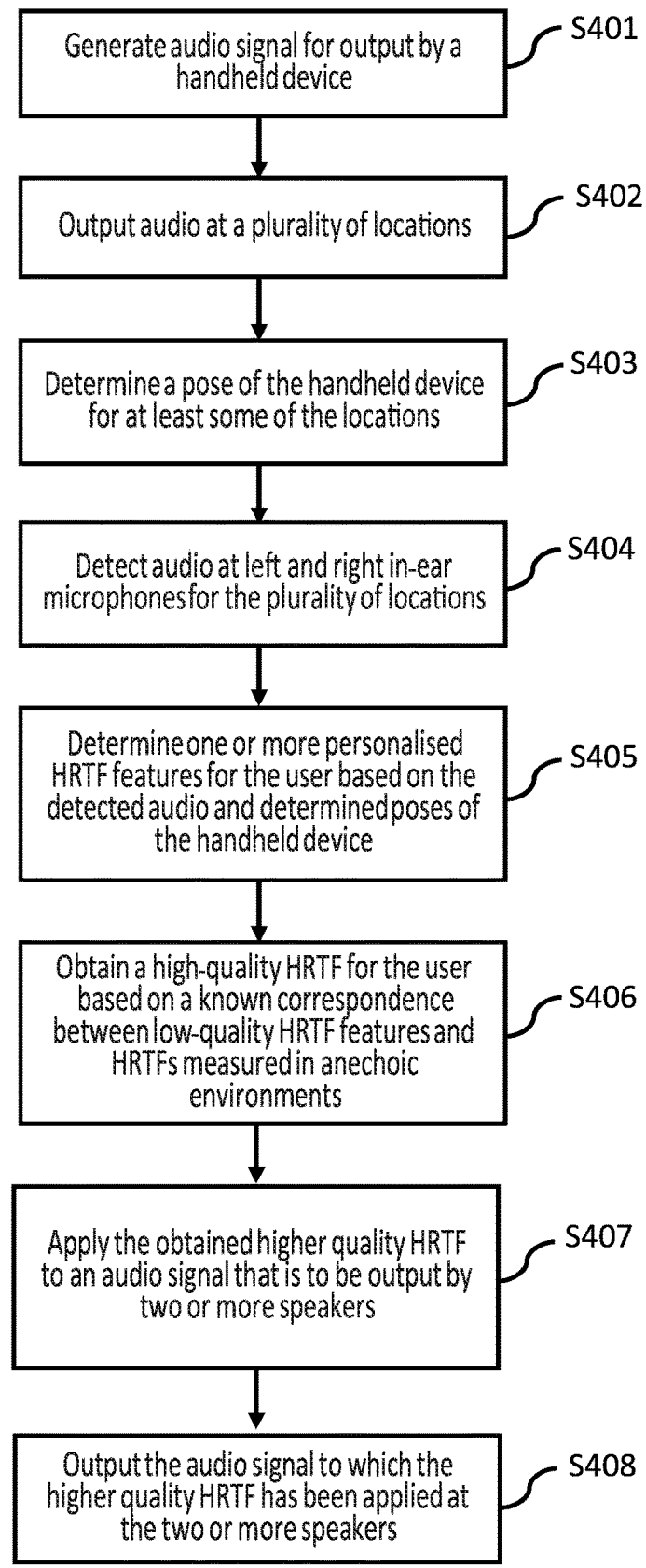
FIG. 11 is a schematic flowchart illustrating a further HRTF generation method.

In some examples the method may further comprise an additional step of applying the obtained higher-quality HRTF to an audio signal that is to be output by two or more speakers, thus generating an audio output signal. An example of such a method is shown in FIG. 11, which corresponds to the method shown in FIG. 4 (which will not be described again here) but with an additional step S408 of applying the obtained higher-quality HRTF to the audio signal and a further step S410 of outputting the resulting audio output signal at two or more speakers. By applying the higher-quality HRTF to the audio signal, the resulting output signal can be generated so as to appear to originate from a desired position in 3D space. The desired location may correspond to the location of a virtual sound source within a virtual environment, for example. The HRTF may be used to ensure that a sound source appears to originate from a location coinciding with an object in virtual, augmented or mixed reality. The object may correspond to a virtual object that is animated as outputting the audio signal (be that as e.g. speech or a sound effect).

In some examples, the audio signal for which the HRTF has been applied may be output at the headphones of an HMD device. This may be the case where, for example, the audio corresponds to audio represented in a virtual environment (e.g. in VR). The virtual environment may include a plurality of sound sources and the relevant higher-quality HRTF may be applied to each of the corresponding audio signals to ensure that each sound source appears to originate from the correct location in the environment, to the user. In other examples, speakers may not form part of an HMD and may simply be output at a pair of headphones that are being worn by the user whilst viewing video content.

In some examples a computer readable medium having computer executable instructions may be adapted to cause a computer system to perform any of the method steps described previously.

A system 1100 for generating an HRTF for a user in accordance with the present disclosure will now be described in relation to FIGS. 11-13.

Figure 12:
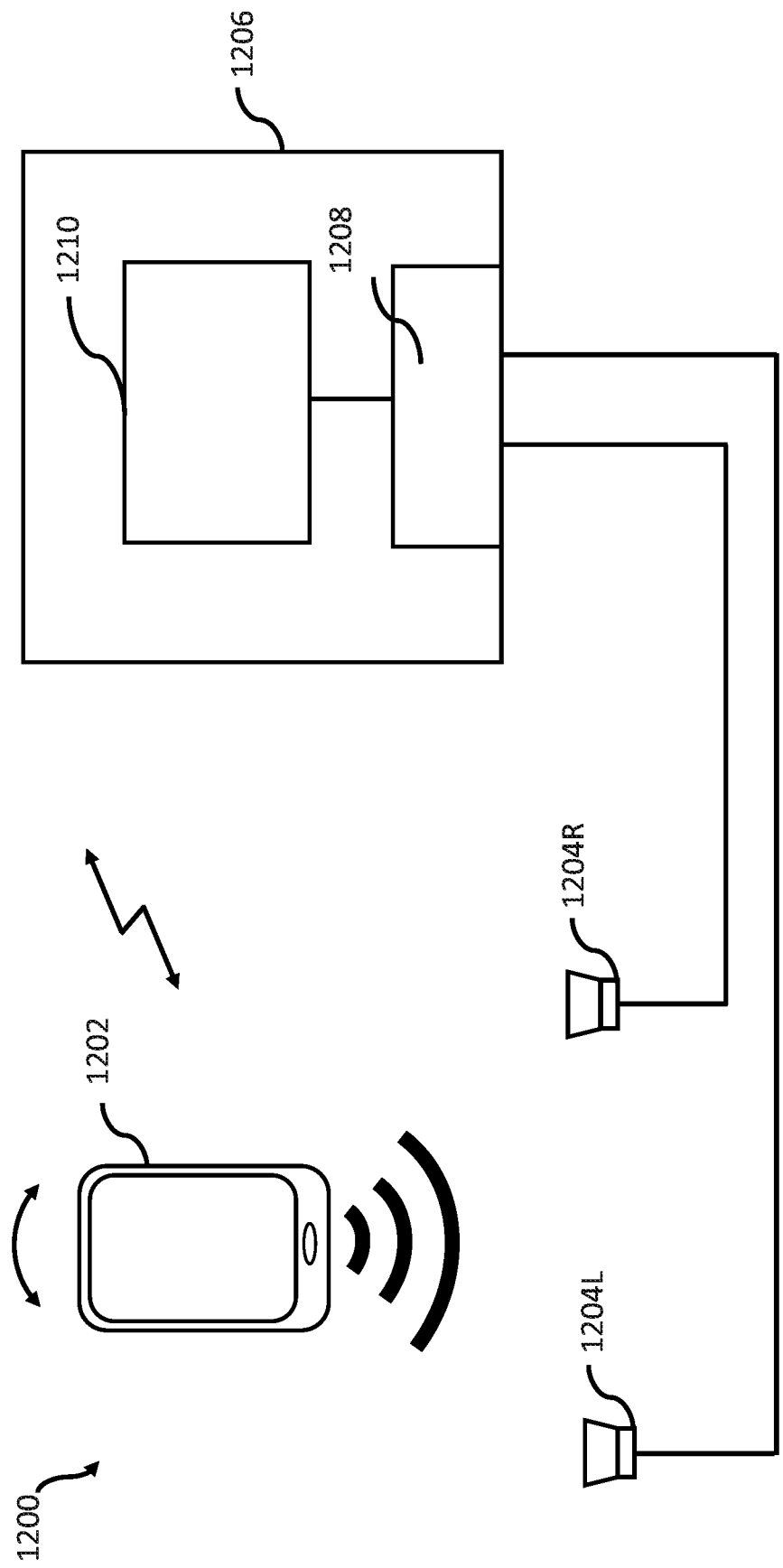
FIG. 12 shows schematically an example of a system for generating an HRTF for a user.

FIG. 12 shows schematically an example of a system for generating an HRTF for a user. The system comprises a handheld device 1202 operable to output audio at a plurality of different spatial locations relative to a head under test. As described above, the head under test may correspond to a user's head, or an artificial head approximating the size and shape of the user's head. The handheld device 1202 may comprise a plurality of speakers for outputting this audio. As described previously, the handheld device 1202 may be configured to output the audio at a plurality of locations by the user moving the handheld device 1202 to those locations. Alternatively or in addition, the different spatial locations may correspond to different poses of the user's head relative to a stationary handheld device. Generally, the handheld device may 1202 correspond to any of the handheld devices described previously in relation to FIG. 4.

The system further comprises a pair of microphones, 1204L, 1204R, for detecting the audio output by the handheld device 1202 at the plurality of different (relative) spatial locations. Each microphone is securable to a respective ear (or ear formation) of the head under test, for example, by virtue of the shape of the microphone and/or a connector associated therewith (e.g. clip). The microphones 1204L, 1204R may correspond to any of the previously described microphones and be secured to the head under test in any of the manners described previously in relation to FIG. 4.

The microphones 1204L, 1204R may be connected to one or more other computing devices 1206 via a wired or wireless connection (e.g. WiFi, Bluetooth®, etc.). The one or more other computing devices 1206 may be responsible for processing the audio that is detected at the microphones 1204L, 1204R.

The system also comprises a pose detector (not shown) for detecting a pose of the handheld device 1202 relative to the head under test (and optionally, body under test). The pose detector may form part of the handheld device 1202, or part of a separate device, such as a camera associated with a different computing device. The pose detector is configured to detect a pose of the head under test relative to the handheld device 1202, for at least some of the relative locations for which audio is output by the handheld device 1202. In some examples, the pose detector is configured to detect (or estimate) a position and/or orientation of the handheld device 1202 relative to the user's ears (although, it may be possible to infer the position and/or orientation of the user's ears, based on a detected pose of the user's head).

The pose detector may be configured to detect a position and/or orientation of the handheld device 1202 relative to the head under test via e.g. one or more accelerometers, gyroscopes, GPS, etc. (as described previously). Alternatively, or in addition the pose detector may comprise a camera for capturing images of the head under test (and optionally, the handheld device 1202 if the camera is separate from the handheld device 1202). The pose detector may be operable to detect a relative pose of the head under test based on the captured images. In examples where images of the user's ears are captured, the pose detector may also be operable to detect a pose of the handheld device relative to the user's ears. Generally, the pose detector is operable to detect a pose of the user's head (for example including their ears and optionally, their body) relative to the handheld device 1202 using any of techniques described previously in relation to FIG. 4.

In FIG. 12, the system is shown as further comprising a feature extractor 1208 configured to receive the audio signal detected at the left and right microphones 1204L, 1204R, and based thereon, determine or derive (i.e. generate) one or more lower quality HRTF features for the head under test. As described previously, these features correspond to lower-quality HRTF features since they will have been measured in a non-anechoic environment such as the user's home. The inputs to the feature extractor 1208 may include, for each detected audio signal, the detected audio signal and the relative pose of the handheld device 1202, for that detected audio signal. The relative pose of the handheld device 1202 for each audio recording may be provided to the feature extractor 1208, via the pose detector. The one or more lower quality HRTF features may comprise any one or more of the ITD, ILD and spectral cues described previously.

The system also comprises an HRTF unit 1210 configured to receive an input from the feature extractor 1208 and in response thereto, obtain a higher-quality HRTF for the user based on the generated one or more lower quality HRTF features. The higher-quality HRTF may be considered an estimation, simulation, approximation or the like as to what the HRTF features would have been for the user, had the user measured the audio output by the handheld device in an anechoic environment (and hence may be considered as a simulation of an HRTF measured in an anechoic environment).

The higher-quality HRTF may be obtained based on a correspondence (e.g. learned via machine learning) between HRTF features measured in non-anechoic environments and corresponding HRTFs measured in anechoic environments. The higher-quality HRTF may be determined as described previously in relation to FIGS. 4-10.

In some examples, the HRTF unit 1210 may comprise a machine learning model trained to map HRTF features measured in non-anechoic environments (i.e. lower quality) to HRTFs measured in anechoic environments (i.e. higher quality). The machine learning model may have been trained with HRTF features measured in non-anechoic environments and HRTFs measured for corresponding users in anechoic environments so as to generate the learned correspondence between the two domains. This mapping may be achieved via any of the methods described previously in relation to FIGS. 4-10.

The system may further comprise an audio output generator (not shown) operable to apply an obtained high-quality HRTF to an audio signal. This audio signal may then be output by a pair of speakers (not shown) that are in communication with the audio output generator.

In FIG. 12, the feature extractor 1208 and HRTF unit 1210 are shown as being implemented at a computing device 1206. The computing device 1206 may correspond to e.g. a video games console, personal computing device, one or more severs, or even the handheld device 1202 (despite being shown as a separate device). In some examples, the feature extractor 1208 and HRTF unit 1210 may be implemented at or distributed across different devices. Ultimately, the device(s) at which the feature extractor 1208 and HRTF unit 1210 are implemented will depend on the amount of data that is to be processed and the hardware capabilities of the devices responsible for that processing.

Once a higher-quality HRTF has been determined for a given user, the higher-quality HRTF may be stored in association with a user profile for that user such as e.g. their PS profile. The higher-quality HRTF may then be accessed and retrieved from the user profile, as and when it is needed. In some cases, the user profile may be an online profile, and the higher-quality HRTF may be retrieved by a device that is able to access the online profile. In additional or alternative examples, the higher-quality HRTF may be stored locally at a user's device (e.g. smartphone, games console, personal computer, head-mountable display etc.) and applied to an audio signal for outputting, as and when it is needed.

Figure 13:
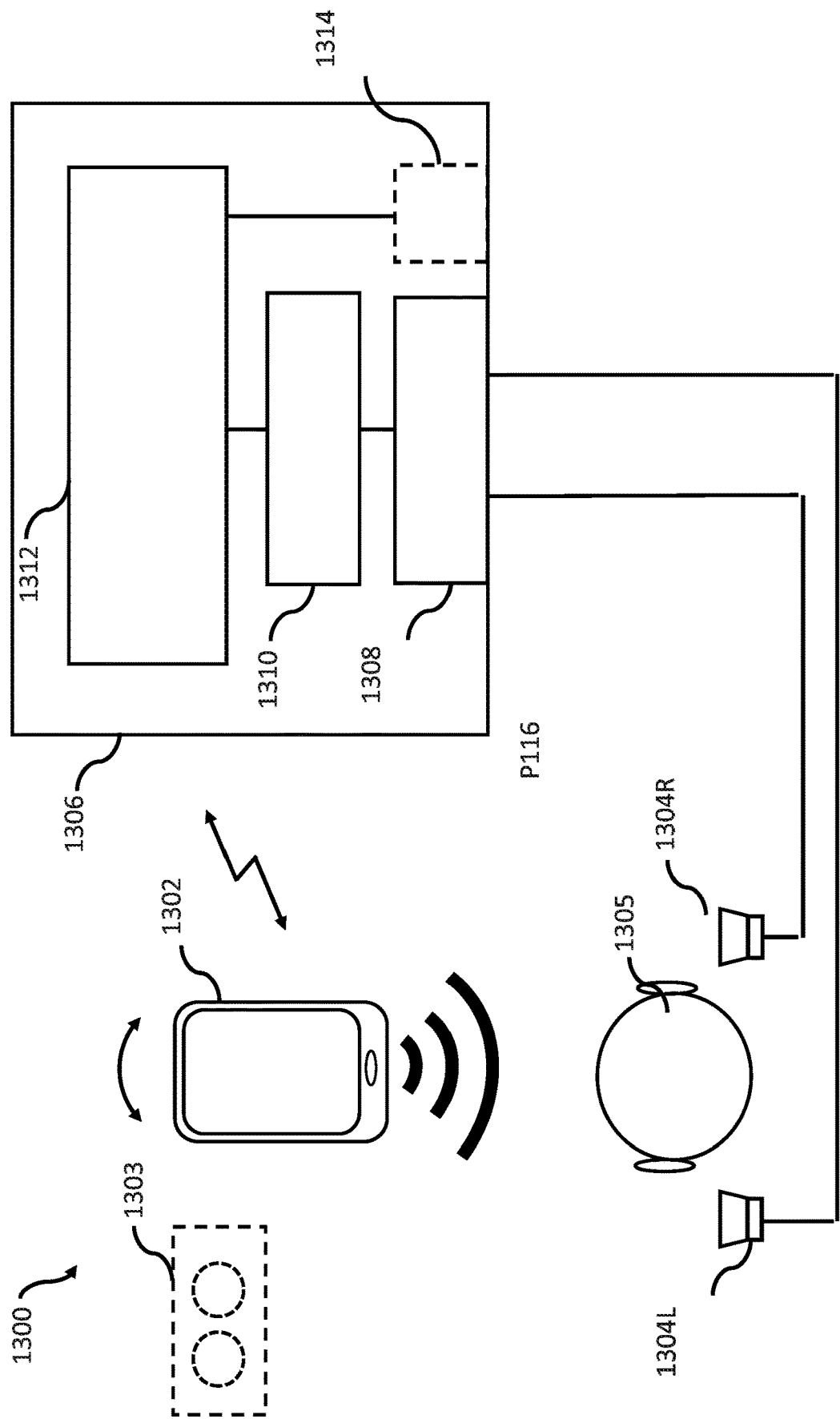
FIG. 13 shows schematically an example of a system for generating an HRTF for a user based on captured images of the user and or user profile information associated with the user.

FIG. 13 shows a further system 1300 that may be used as an alternative to, or in combination with the system shown in FIG. 12. The system comprises a handheld device 1302 that may correspond to the handheld device 1202 described in relation to FIG. 12.

The system 1300 comprises a camera 1303 operable to capture images of the head under test 1305 (e.g. the user's head). In FIG. 13, the camera 1303 is shown as a separate stereoscopic camera. However, other types of camera may also be used. In some examples, the camera 1303 may form part of the handheld device and not be a separate device. The camera 1303 may correspond to any of the cameras described previously in relation to FIG. 4.

In FIG. 13, the system 1300 further comprises a computing device 1306 operable to generate one or more lower quality HRTF features for the user 1305. The computing device 1306 may correspond to the computing device 1206 described in relation to FIG. 12, but with one or more additional components, as described below.

The computing device 1306 comprises an image analyser 1308 operable to receive the images captured by the camera 1303 and to extract one or more anatomical features of the head under test 1305 from the captured images. This may involve, for example, identifying the parts of the captured images corresponding to e.g. the user's head, body and or ears, i.e. the parts of the user's anatomy relevant for determining one or more lower quality HRTF features for the user 1305. The relevant parts of the captured images may be identified using e.g. machine learning or computer vision techniques.

The computing device 1306 also comprises a modelling unit 1310 configured to receive image data from the image analyser 1308 and to generate, based on the received image data, a 3D model of the anatomical features of the head under test relevant for determining (i.e. generating) the one or more lower quality HRTF features for the user. The image data may correspond to colour and or depth images of the user's head, body and or ears, for example.

In some examples, the 3D model of the user's head, ears and or body may be provided as an input to an HRTF unit 1312. Alternatively, the 3D model may be analysed so as to determine 3D features of the user's head, body and or ears, and information about these 3D features may be provided as an input to the HRTF unit 1312.

The HRTF unit 1312 may correspond to the HRTF unit 1210 described previously in relation to FIG. 12. That is, the HRTF unit 1312 may be configured to determine one or more lower quality HRTF features based on both the audio detected at the microphones 1304L, 1304R and the 3D anatomical feature information derived from the captured images. In the latter case, the one or more lower quality HRTF features may be generated as described previously (see 'anatomical features' section).

In some examples, the system may further comprise a user profile unit 1314 operable to obtain (e.g. receive) user information from a profile associated with the head under test 1305. For example, user information associated with the user for which the high-quality HRTF is to be determined. The use profile may comprise at least one of: (i) one or more images of the user, (ii) an age of the user, (iii) a sex of the user, (iv) a height of the user, (v) a location of the user, etc. This information may be provided to the HRTF unit 1312 or a separate, user-profile dedicated HRTF unit 1312, which is configured to determine or more lower quality HRTF features for the user 1305 based on this information. The one or more lower quality HRTF features may be determined as described previously in relation to user profiles ('anatomical features').

In some examples, the system comprises a head-mountable display (HMD) for displaying a virtual, augmented and or mixed reality to a wearer of the HMD. The HMD may comprise two or more speakers for outputting audio. The HMD may be operable to apply the higher-quality HRTF obtained by the HRTF unit 1210 or 1312 to an audio signal that is to be output by the speakers of the HMD. Alternatively or in addition, the HMD may be configured to receive an audio signal for outputting, wherein the higher-quality HRTF has already been applied to that signal. By applying the obtained higher-quality HRTF to the audio signal, the user may perceive the audio signal as originating from a particular location in 3D space.

Figure 14:
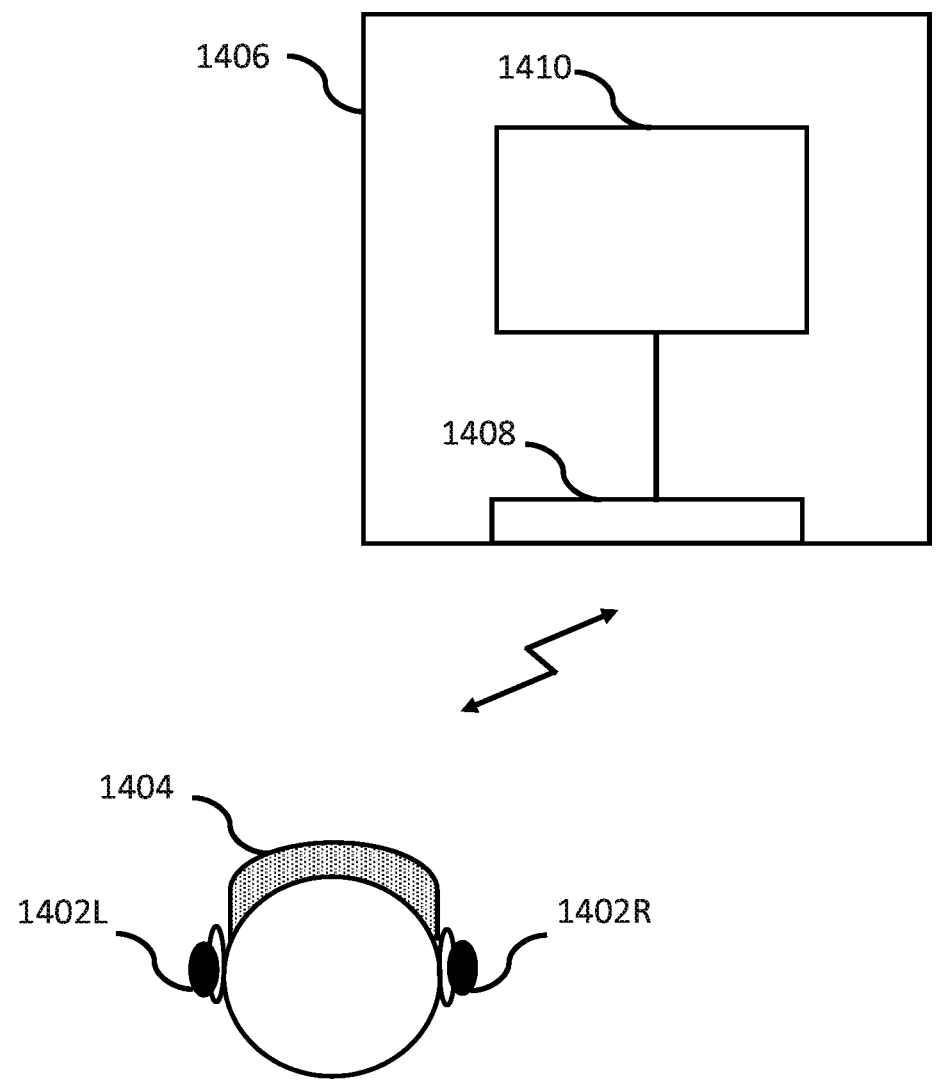
FIG. 14 shows schematically an example of a system for outputting audio at the speakers of a head-mountable display in accordance with a generated HRTF.

FIG. 14 shows schematically an HMD 1404 in communication (wirelessly) with a computing device 1406 at which the higher-quality HRTF is stored or that is operable to retrieve the higher-quality HRTF from e.g. an online database. In FIG. 14, the computing device 1406 comprises a communication interface 1408 for communicating with the HMD 1404 e.g. a via a wired or wireless connection. The computing device 1406 also comprises electronic memory 1410 for storing one or more higher-quality HRTFs for users. The HMD 1404 comprises a pair of speakers 1402L and 1402R for outputting audio. The audio output by the speakers 1402L and 1402R may be perceived by a wearer of the HMD 1404 as originating from a specific location in 3D, based on a user-specific higher-quality HRTF having been applied to that signal.

It will be appreciated that example embodiments can be implemented by computer software operating on a general-purpose computing system such as a games machine. In these examples, computer software, which when executed by a computer, causes the computer to carry out any of the methods discussed above is considered as an embodiment of the present disclosure Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

It will also be appreciated that the systems described in relation to FIGS. 12 to 14 may be used to implement the methods described in relation to FIGS. 4 to 11.

It will be further appreciated that the plots shown in FIGS. 5-9 are intended to demonstrate the different audio features that may be measured, when determining an HRTF for a user, and that these plots may not necessarily correspond to audio features measured in a non-anechoic environment.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of obtaining a head-related transfer function, HRTF, the method comprising:
    generating an audio signal for output by a handheld device;
    outputting the generated audio signal at the handheld device, the audio signal being output at a plurality of locations by the handheld device being moved to those locations;
    detecting the audio output by the handheld device at a pair of microphones for location at positions corresponding to the left and right ears of a head under test;
    detecting a pose of the handheld device relative to the head under test for at least some of the plurality of locations at which audio is output by the handheld device;
    generating, based on the detected audio signal at the microphones and the detected poses of the handheld device, one or more lower quality HRTF features for the head under test; and
    obtaining, based on the one or more lower quality HRTF features for the user, a high-quality HRTF for the head under test, the high-quality HRTF being a simulation of an HRTF measured in an anechoic environment and being obtained based on a correspondence between HRTF features determined in non-anechoic environments and HRTFs measured in anechoic environments, wherein:
    the correspondence between HRTF features determined in non-anechoic environments and HRTFs measured in anechoic environments is a learned correspondence;
    the step of obtaining the high-quality HRTF comprises inputting the one or more lower quality HRTF features to a machine learning model; and
    the machine learning model is trained to map HRTF features determined in non-anechoic environments to HRTFs measured in anechoic environments so as to generate the learned correspondence, the machine learning model being trained with HRTF features determined for heads under test in non-anechoic environments and HRTFs measured for heads under test in anechoic environments.

2. The method of claim 1, wherein the machine learning model comprises at least one of a trained domain-adversarial network and a trained generative adversarial network.

3. The method of claim 1, wherein the handheld device comprises a mobile device; and wherein the mobile device comprises an accelerometer and/or a gyroscope for determining the pose of the mobile device relative to the head under test, at the at least some of the plurality of locations.

4. The method of claim 1, wherein the head under test comprises the head of the user, the method comprising obtaining user information indicative of one or more anatomical features of the user; and wherein generating the one or more lower quality HRTF features for the head under test is further based on the obtained user information.

5. The method of claim 4, wherein obtaining the user information comprises capturing a plurality of images of the user, the images including anatomical features of the user relevant for determining the one or more lower quality HRTF features for the user; and wherein the plurality of images are captured as the pose of the handheld device relative to the user changes.

6. The method of claim 1, wherein obtaining user information comprises obtaining information from a user profile associated with the user, the user information comprising at least one of:
    (i) images of the user;
    (ii) an age of the user;
    (iii) a sex of the user;
    (iv) a height of the user; and
    (v) a location of the user.

7. The method of claim 1, comprising applying the obtained high-quality HRTF to an audio signal to produce an output signal; and outputting the output signal at two or more speakers.

8. A non-transitory machine-readable storage medium which stores computer software which, when executed by a computer, causes the computer to perform a method for obtaining a head-related transfer function, HRTF, the method comprising:
- generating an audio signal for output by a handheld device;
- outputting the generated audio signal at the handheld device, the audio signal being output at a plurality of locations by the handheld device being moved to those locations;
- detecting the audio output by the handheld device at a pair of microphones for location at positions corresponding to the left and right ears of a head under test;
- detecting a pose of the handheld device relative to the head under test for at least some of the locations at which audio is output by the handheld device;
- generating, based on the detected audio signal at the microphones and the detected poses of the handheld device, one or more lower quality HRTF features for the head under test; and
- obtaining, based on the one or more lower quality HRTF features for the user, a high-quality HRTF for the head under test, the high-quality HRTF being a simulation of an HRTF measured in an anechoic environment and being obtained based on a correspondence between HRTF features determined in non-anechoic environments and HRTFs measured in anechoic environments, wherein:
- the correspondence between HRTF features determined in non-anechoic environments and HRTFs measured in anechoic environments is a learned correspondence;
- the step of obtaining the high-quality HRTF comprises inputting the one or more lower quality HRTF features to a machine learning model; and
- the machine learning model is trained to map HRTF features determined in non-anechoic environments to HRTFs measured in anechoic environments so as to generate the learned correspondence, the machine learning model being trained with HRTF features determined for heads under test in non-anechoic environments and HRTFs measured for heads under test in anechoic environments.

9. A system for generating a head-related transfer function, HRTF, the system comprising:
- a handheld device operable to output an audio signal at a plurality of different spatial locations relative to a head under test;
- at least two microphones for detecting the audio output by the handheld device at the plurality of different spatial locations, each microphone being securable to a respective ear of the head under test;
- a pose detector configured to detect a pose of the handheld device relative to the head under test at the plurality of different spatial locations;
- a feature extractor configured to generate one or more lower quality HRTF features for the head under test based on the detected poses of the handheld device and the audio signal detected by the at least two microphones; and
- an HRTF unit operable to obtain a high-quality HRTF for the user based on the one or more lower quality HRTF features determined for the user, the high-quality HRTF being a simulation of an HRTF being measured in an anechoic environment, the high-quality HRTF being obtained based on a correspondence between HRTF features measured in non-anechoic environments and high-quality HRTFs measured in anechoic environments, wherein:
- the correspondence between HRTF features determined in non-anechoic environments and HRTFs measured in anechoic environments is a learned correspondence;
- the obtaining the high-quality HRTF comprises inputting the one or more lower quality HRTF features to a machine learning model; and
- the machine learning model is trained to map HRTF features determined in non-anechoic environments to HRTFs measured in anechoic environments so as to generate the learned correspondence, the machine learning model being trained with HRTF features determined for heads under test in non-anechoic environments and HRTFs measured for heads under test in anechoic environments.

10. The system of claim 9, wherein the handheld device comprises the pose detector and wherein the handheld device is configured to provide an indication of the detected poses of the handheld device to the feature extractor.

11. The system of claim 9, comprising:
- a camera operable to capture images of the head under test;
- an image analyser configured to extract one or more anatomical features of the head under test from the images captured by the camera;
- a modelling unit configured to generate a 3D model of the anatomical features of the head under test relevant for determining the one or more lower quality HRTF features for the head under test; and
- wherein the HRTF unit is further configured to generate the one or more lower quality HRTF features for the head under test based on the 3D model of the anatomical features generated by the modelling unit.

12. The system of claim 11, wherein the handheld device comprises the camera and wherein the handheld device is operable to capture images of the head under test whilst audio is being output at the handheld device.

13. The system of claim 9, comprising:
- a user profile unit operable to obtain user information from a profile associated with the head under test, the head under test comprising the head of a user;
- the user information comprising at least one of: (i) images of the user; (ii) an age of the user; (iii) a sex of the user; (iv) a location of the user; and
- wherein the HRTF unit is further configured to generate the one or more lower quality HRTF features for the user based on the user information obtained by the user profile unit.

14. The system of claim 9, comprising a head-mountable display (HMD), the HMD comprising two or more speakers for outputting audio; and
- wherein the two or more speakers of the HMD are operable to output an audio signal to which the obtained high-quality HRTF has been applied.

* * * * *